(12) United States Patent
Shapiro et al.

(10) Patent No.: US 6,246,782 B1
(45) Date of Patent: *Jun. 12, 2001

(54) SYSTEM FOR AUTOMATED DETECTION OF CANCEROUS MASSES IN MAMMOGRAMS

(75) Inventors: Gary Lee Shapiro, Evergreen; Davis ReGoalt Oliver, Jr., Littleton, both of CO (US)

(73) Assignee: Lockheed Martin Corporation, Bethesda, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/870,709

(22) Filed: Jun. 6, 1997

(51) Int. Cl.$^7$ ..................................................... G06K 9/00
(52) U.S. Cl. ............................. 382/128; 128/925; 378/37
(58) Field of Search ................................. 382/128–133, 382/100, 155, 181, 194, 224, 274, 275, 280, 286, 299, 308, 156–160, 278, 279; 378/37, 4; 600/408, 410, 300, 425; 706/15; 137/93; 244/3.17; 250/339.08, 559.05; 324/76.21; 359/559–561; 128/925, 922

(56) References Cited

U.S. PATENT DOCUMENTS

| 4,769,850 | 9/1988 | Itoh et al. ............................. 382/132 |
| 4,839,807 | 6/1989 | Doi et al. .............................. 382/128 |
| 4,845,762 | 7/1989 | Higashi et al. ....................... 382/132 |
| 4,851,984 | * 7/1989 | Doi et al. .............................. 382/108 |
| 4,907,156 | 3/1990 | Doi et al. .............................. 382/130 |
| 4,912,647 | 3/1990 | Lam et al. ............................ 348/367 |
| 4,918,534 | 4/1990 | Lam et al. ............................ 348/367 |
| 4,941,122 | 7/1990 | Weideman ........................... 382/158 |
| 4,961,425 | 10/1990 | Kennedy et al. ..................... 600/425 |

(List continued on next page.)

OTHER PUBLICATIONS

Kunio Doi, et al.; "Computer–Aided Diagnosis: Development of Automated Schemes for Quantitative Analysis of Radiographic Images"; Apr. 1992; pp 140–152; *Seminars in Ultrasound, CT, and MRI*, vol. 13, No. 2.

R.M. Nishikawa, et al.; "Performance of Automated CAD Schemes for the Detection and Classification of Clustered Microcalcifications"; 1994; pp. 13–20; *Elsevier Science V.B.*

D.H. Davies and D.R. Dance; "Automated Computer Detection of Clustered Calcifications in Digital Mammograms"; Apr. 12, 1990; pp 1111–1118; *Phys. Med. Biol.*, 1990, vol. 35, No. 8.

Shun Leung Ng and Walter F. Bischof; "Automated Detection and Classification of Breast Tumors"; Mar. 4, 1991; pp. 218–237; *Computers and Biomedical Research 25*.

(List continued on next page.)

*Primary Examiner*—Jay Patel
(74) *Attorney, Agent, or Firm*—Marsh Fischmann & Breyfogle LLP (57) ABSTRACT

A system for automated detection of cancerous masses in mammograms initially identifies regions of interest (ROIs) using Fourier analysis (e.g., by means of an optical correlator). Context data is extracted from the mammogram for each ROI, such as size, location, ranking, brightness, density, and relative isolation from other ROIs. The pixels in the ROI are averaged together to create a smaller array of super-pixels, which are input into a first neural net. A second neural net receives the output values from the first neural net and the context data as inputs and generates an output score indicating whether the ROI contains a cancerous mass. The second neural net can also be provided with context data from another view of the same breast, the same view of the other breast, or a previous mammogram for the same patient.

47 Claims, 7 Drawing Sheets

U.S. PATENT DOCUMENTS

| | | | |
|---|---|---|---|
| 5,003,979 | 4/1991 | Merickel et al. | 600/410 |
| 5,046,019 | 9/1991 | Basehore | 706/1 |
| 5,133,020 | 7/1992 | Giger et al. | 382/128 |
| 5,212,637 | 5/1993 | Saxena | 600/407 |
| 5,224,177 | 6/1993 | Doi et al. | 382/168 |
| 5,319,549 | 6/1994 | Katsuragawa et la. | 382/108 |
| 5,343,390 | 8/1994 | Doi et al. | 382/132 |
| 5,359,513 | 10/1994 | Kano | 382/128 |
| 5,365,429 | 11/1994 | Carman | 378/37 |
| 5,418,380 | 5/1995 | Simon et al. | 250/550 |
| 5,452,367 | 9/1995 | Bick et al. | 382/128 |
| 5,463,548 | 10/1995 | Asada et al. | 600/300 |
| 5,469,353 | 11/1995 | Pinsky et al. | 382/131 |
| 5,491,627 | 2/1996 | Zhang et al. | 600/408 |
| 5,513,101 | 4/1996 | Pinsky et al. | 705/3 |
| 5,513,273 | 4/1996 | Ito | 382/132 |
| 5,526,394 | 6/1996 | Siczek et al. | 378/37 |
| 5,537,485 | 7/1996 | Nishikawa et al. | 382/130 |
| 5,572,565 | 11/1996 | Abdel-Mottaleb | 378/37 |
| 5,574,799 | 11/1996 | Bankman et al. | 382/132 |
| 5,579,360 | 11/1996 | Abdel-Mottaleb | 378/37 |
| 5,586,160 | 12/1996 | Mascio | 378/37 |
| 5,713,364 * | 2/1998 | DeBaryshe et al. | 600/476 |
| 5,734,739 * | 3/1998 | Sheehan et al. | 382/130 |
| 5,754,693 * | 5/1998 | Takesue et al. | 382/224 |
| 5,790,691 * | 8/1998 | Narayanswamy et al. | 382/133 |
| 5,799,100 * | 8/1998 | Clarke et al. | 382/132 |
| 5,815,591 * | 9/1998 | Roehrig et al. | 382/130 |
| 5,825,910 * | 10/1998 | Vafai | 382/132 |
| 5,836,872 * | 11/1998 | Kenet et al. | 600/306 |

OTHER PUBLICATIONS

W.P. Kegelmeyer, Jr. and M.C. Allmen; "Dense Feature Maps for Detection of Calcifications"; 1994; pp. 3–13; *Elsevier Science B.V.*

D.S. Brettle, et al; "Automatic Micro–calcification Localisation using Matched Fourier Filtering"; 1994; pp. 21–30; *Elsevier Science B.V.*

Hara Takeshi et al, Digital Mammography '96, Proceedings of the 3rd International Workshop on Digital Mammography, Jun. 9–12, 1996, pp. 257–262.

Cardenosa, "Mammography: An Overview", Digital Mammography '96, Proceedings of the 3rd International Workshop on Digital Mammography, Jun. 9–12, 1996, pp. 3–10.*

* cited by examiner

SYSTEM FOR AUTOMATED DETECTION OF CANCEROUS MASSES IN MAMMOGRAMS

BACKGROUND OF THE INVENTION

1. Field of the Invention

The present invention relates generally to the field of computer-aided diagnosis of medical images. More specifically, the present invention discloses an automated system for detecting cancerous masses in digital mammograms.

2. Statement of the Problem

While the problem of reducing breast cancer mortality is substantial, mammography provides an important tool for early detection. False negative rates are high, however, resulting largely from the varying patterns of breast tissue and their ability to disguise a cancer. Systems that can rapidly scan and analyze many mammograms can help radiologists reduce such errors. However, to date, such systems have not been practical for clinical use because they have neither achieved sufficient performance (sensitivity and specificity) nor the required processing speed for analyzing mammograms in a cost-effective, near real-time manner.

Since no two breast lesions look the same, computer-aided diagnosis of mammograms must be capable of generalizing to make correct decisions on data patterns of lesions that the computer has never before experienced. This is analogous in many ways to locating camouflaged targets in that neither "target" is well defined, and detection may require looking for large scale features and distortions of the overall scene (or total breast).

The prior art in the field includes the following:

Doi et al. "Computer-aided Diagnosis: Development of Automated Schemes for Quantitative Analysis of Radiographic Images," *Seminars in Ultrasound, CT, and MRI* 1992, 13:140–152.

Nishikawa et al., "Performance of Automated CAD Schemes for the Detection and Classification of Clustered Microcalcifications," In: *Digital Mammography*, Elsevier Science B. V., The Netherlands, 1994, 13–20.

Davies et al., "Automatic Computer Detection of Clustered Calcifications in Digital Mammograms," *Phy. Med. Biol.* 1990, 35:8:1111–1118.

Ng et al., "Automated Detection and Classification of Breast Tumors," *Computers and Biomedical Research* 1992, 25:218–237.

Kegelmeyer, Jr. et al., "Dense Feature Maps for Detection of Calcifications," In: *Digital Mammography*, Elsevier Science B. V., The Netherlands, 1994, 3–12.

Brettle et al., "Automatic Microcalcification Localisation using Matched Fourier Filtering," *Digital Mammography*, Elsevier Science B. V., The Netherlands, 1994, pp. 21–30.

The prior art includes a variety of systems to detect both microcalcifications and mass lesions. For microcalcification or mass classification, the prior art techniques include either the use of features extracted by human observers or computer-extracted features. The latter features for microcalcifications include shape analysis such as compactness, Fourier descriptors of image boundaries, and average distance between calcifications applied to the extracted features. For mass classification methods, features used include spiculations or irregular masses that are identified by local radiating structures or analysis of gradient histograms generated by seed growing and local thresholding methods, morphologically-based features and image texture. These features are classified using either neural networks or binary decision trees. Common to all of these approaches is limited testing, with the computationally-intensive nature of the process implied as one reason for less than full, comprehensive testing.

Researchers associated with the University of Chicago (or Arch Development Corp.) have been major contributors in the development of computer-aided diagnosis for mammogram analysis (e.g., Doi et al.). This group has developed an automatic scheme for detecting clustered microcalcifications and is evaluating a method for classification of clusters. One approach involves using a linear filter to improve the signal-to-noise ratio of microcalcifications. Signal-extraction criteria are imposed to distinguish true lesions from artifacts. The computer then indicates locations that may contain clusters of microcalcifications on the film. These investigators were able to demonstrate that use of the program improved radiologists' accuracy in detecting clustered microcalcifications. In the detection computer-aided diagnosis scheme, 78 digitized mammograms (half with, half without clusters) were processed and achieved 87% sensitivity to detection of clusters.

Davies et al. have described a system for detection of clusters of calcifications using image analysis techniques. Their method was based on a local area thresholding process, and was also able to identify other breast structures relative to the clusters of calcification. The results of their feasibility trial were a 100% true positive classification (for clusters), with an 8% false positive rate and 0% false negatives.

A more complex automated model is described by Ng et al. for the detection and classification of stellate lesions and circumscribed lesions. The relative strength of this system is that both stellate and circumscribed lesions appear as circular, bright masses with fuzzy boundaries but they may be difficult to distinguish by an automated system. Their pilot trial showed a high detection rate with a low false positive rate.

Kegelmeyer et al. have reported promising results when applying algorithms using binary decision trees and a dense feature map approach in identifying spiculated lesions and calcifications. Kegelmeyer et al. have achieved 100% sensitivity and 82% specificity when merging edge information identifying spicules with local texture measures, thus eliminating false-positive detections.

Brettle et al. demonstrated a true positive success rate of 100% and false positive and false negative rates of 0% each when using matched Fourier filtering in the frequency domain of mammographic images for detecting microcalcification clusters. This application only used 15 segments of images, seven containing microcalcifications and eight without microcalcifications.

Other efforts by the National Institutes of Health and the National Science Foundation include: (i) gray scale image processing for better presentation of the image to the radiologist; (ii) applications of solutions of large-scale constrained optimization problems; (iii) adapting eye dwell time as a cuer; and (iv) spatial filters and signal extraction techniques for detection of microcalcifications; noise smoothing, edge enhancement, and structured background correction methods for detection of the mass boundary and characteristics such as size, density, edge sharpness, calcifications, shape, lobulation, and spiculation extracted from the mass and used for classification.

All of the aforementioned reports indicate some level of success, though most use single scale techniques, not multiscale which is essential to a high confidence result. From the data presented, it is difficult to compare the various results since there is no common data set. It is also difficult to assess the complexity of each data set.

3. Solution to the Problem.

The present approach is based on an innovative concept to detect patterns in medical images (e.g., mammograms) using a Fourier transform optical correlator for image analysis followed by a series of neural networks hosted on a digital computer to analyze the results. An optical processor allows higher-order bandwidth, multi-resolution, multi-orientation approaches for feature extraction and enhancement that are not feasible in feal time on a digital computer. A hybrid optical/digital computer approach ensures sufficient processing power at a moderate cost to accommodate discriminating algorithms and yet analyze a mammogram in a matter of seconds.

SUMMARY OF THE INVENTION

This invention provides a system for automated detection of cancerous masses in mammograms. The mammogram is digitized and regions of interest (ROIs) are detected using Fourier analysis (e.g., by means of an optical correlator). The pixels in the ROI are averaged together to create a smaller array of super-pixels that are input into a first neural net. Context data is extracted from the mammogram for each ROI, such as size, location, ranking, brightness, density, and relative isolation from other ROIs. A second neural net receives the output values from the first neural net and the context data as inputs and generates an output score indicating whether the ROI contains a cancerous mass. The second neural net can also be provided with context data from another view of the same breast, the same view of the other breast, or a previous mammogram for the same patient.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
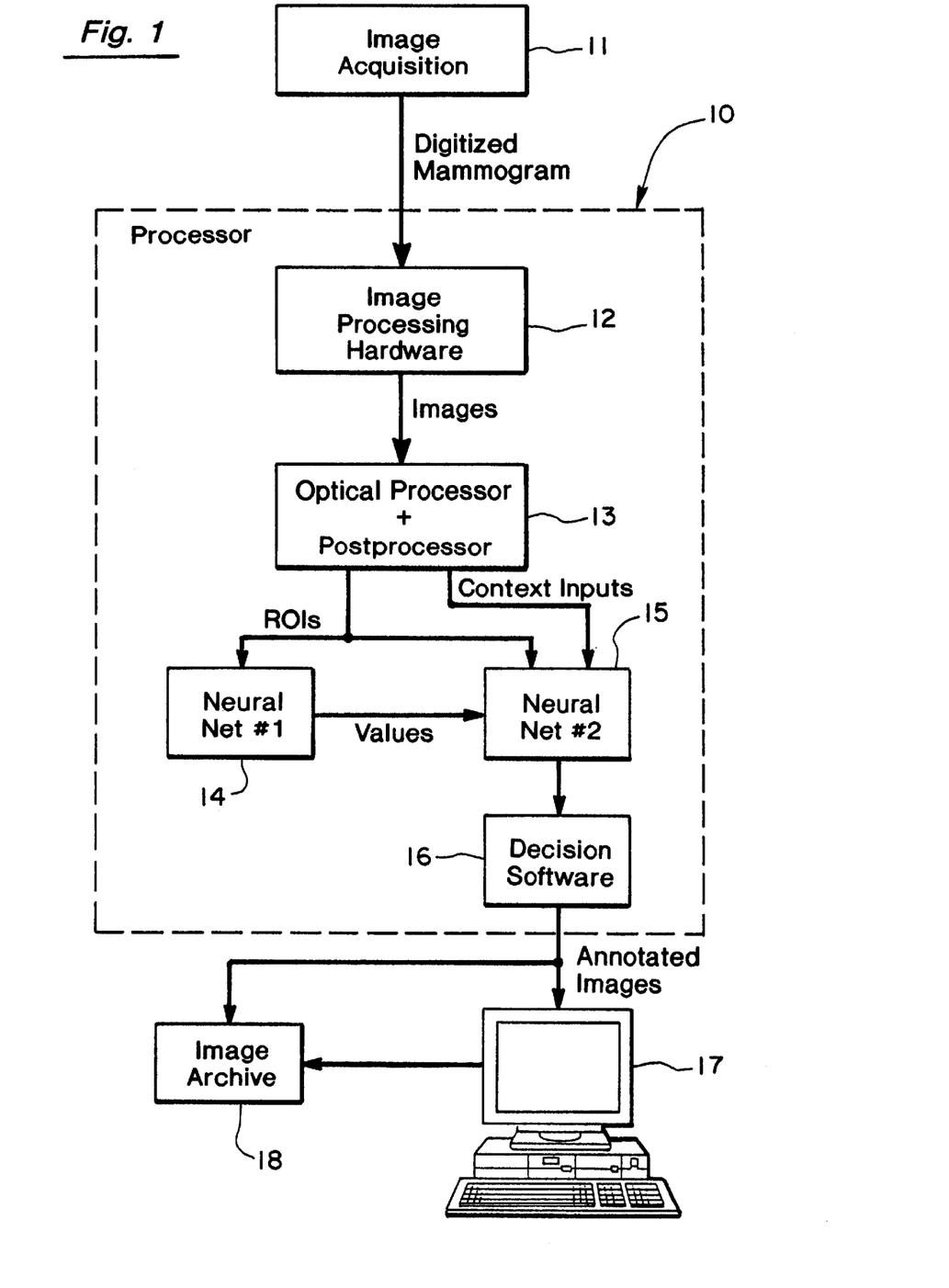
FIG. 1 is a simplified block diagram of the present invention.

FIG. 1 provides a simplified block diagram of the overall system. A corresponding flow chart of the process used in the present invention is illustrated in FIG. 2.

1. Acquire Digital Image of Mammogram.

Figure 2:
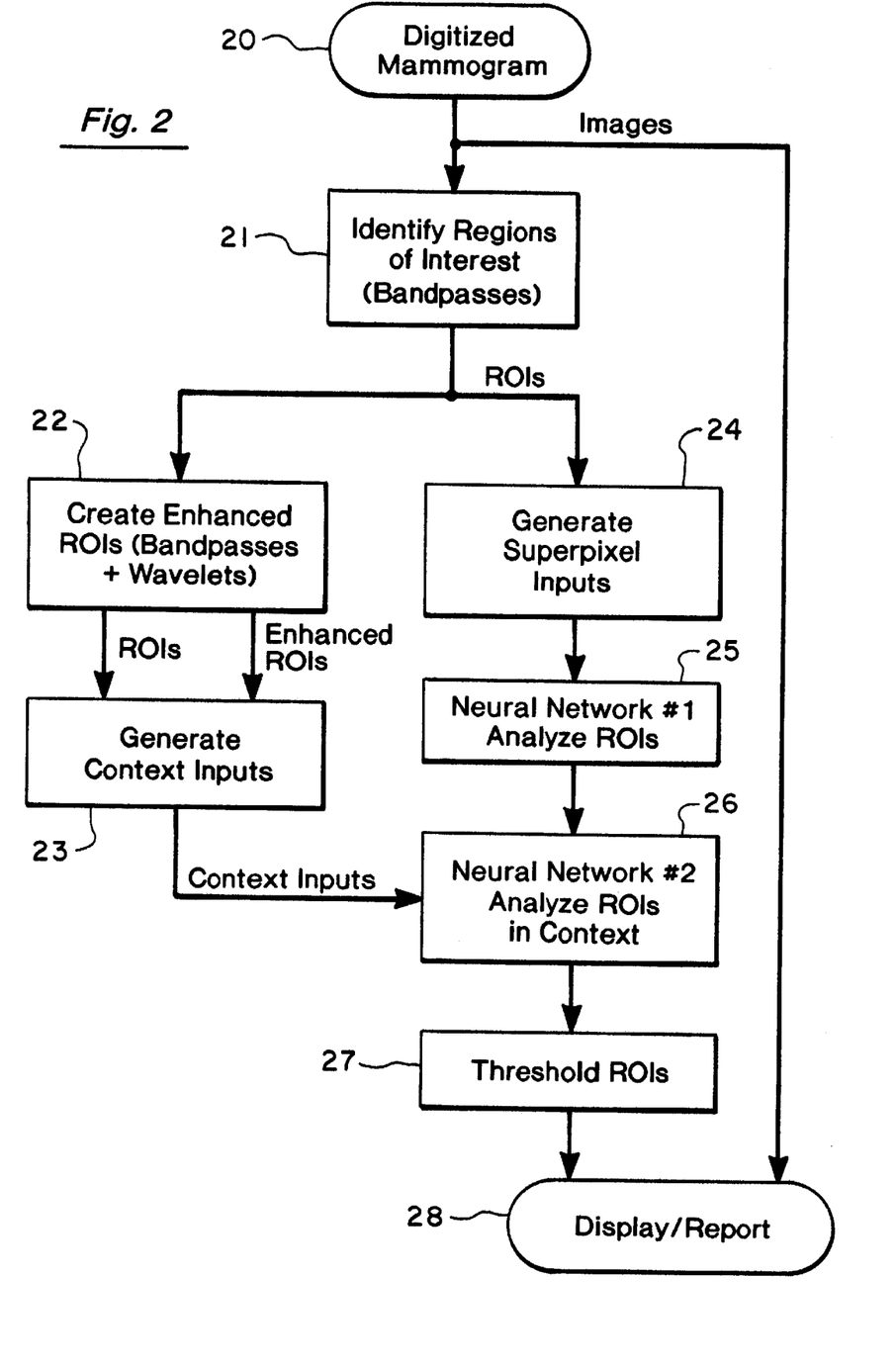
FIG. 2 is a flow chart of the present invention.

The first step in the process shown in FIG. 2 is acquisition of a digital mammogram 20 for analysis. A wide variety of hardware 11 can be used for image acquisition. For example, a high-resolution scanner can be used to scan a conventional mammogram film, or a direct digital image can be acquired. However, it is important that certain minimum standards be met. It is anticipated that 70 micron, 12 bit (reduced to 8 bit) digitization will be required if the present system is used for the purpose of aiding a radiologist in evaluating mammograms, and that 35 micron, 12 bit (reduced to 8 bit) digitization will be required for automated screening of mammograms.

Mammograms are typically paired by views (mediolateral and craniocaudal). As illustrated in FIG. 2, raw digitized images 20 are received by the workstation. These images are raw, single byte images in the 35–70 micron resolution range. Either a fixed size is used for the image or information on the pixel width and height of the image is included. A header is added to the image that allows the system to know the size and data type of the image. A database is used to track the image, its size, and orientation (left breast, right breast, craniocaudal, or mediolateral). The quality of imagery is also examined. This is primarily a check that the image is a mammogram (i.e., it has the features of a mammogram) and that it meets specifications indicative of a mammogram ready to be read by a radiologist.

Image processing hardware 12 reduces the scale of the image to a resolution of approximately 230 microns. This reduces the processing requirement while maintaining sufficient resolution to identify regions of interest (ROIs). A blurring/contrast reduction algorithm is used where the image is superimposed on the background, to reduce "edge effects" (i.e., erroneous high frequency signals created by a sudden drop-off or edge).

2. Identify Regions of Interest.

Regions of interest are identified in the image by Fourier analysis, as shown at reference number 21 in FIG. 2. This is done by comparing four bandpassed images with the original image and looking for "peaks". Bandpass filtering can be done in the digital domain using conventional computer hardware and signal processing algorithms. However, an optical correlator 13 such as that shown in U.S. Pat. No. 5,418,380 (Simon et al.) is used in the preferred embodiment of the present invention to decrease processing time and increase through-put. This approach selects bright spots of specific sizes and passes them on to the neural networks 14, 15 for analysis.

Four bandpass filters are used to detect feature sizes. These bandpass filters are as follows:

(a) 38 micron resolution—detects features approximately in 0.5–5 mm range. The peak detector eliminates anything smaller than about 2.5 mm.

(b) 76 micron resolution—detects feature sizes approximately in 2.5 mm–1 cm range.

(c) 152 micron resolution—detects feature sizes approximately in 5 mm–2 cm range.

(d) 305 micron resolution—detects feature sizes approximately in 1 cm–4 cm range.

The 230-micron images are correlated with each of the bandpass filters. For each of these four bandpasses, the strongest peaks are detected, then the sizes of the peaks are estimated by measuring the number of pixels around the peak that are:

(a) at least 30% of the peak brightness of the bandpassed image; and (b) at least 70% of the brightness of the original image measured at the peak location; and (c) at least 20% of the maximum brightness of the original image.

Peaks that are too small or too large relative to the scale of the bandpass are immediately rejected. A more detailed size determination is made on the remaining peaks. A radial size is calculated by measuring the distance from the peak in several directions until the pixel brightness is:

(a) less than $1/\exp(2)$ of the peak brightness; or (b) less than 70% of the brightness of the original image measured at the peak location; or (c) greater than 5% higher than the next pixel closer to the peak ("peak overlap").

Figure 3:
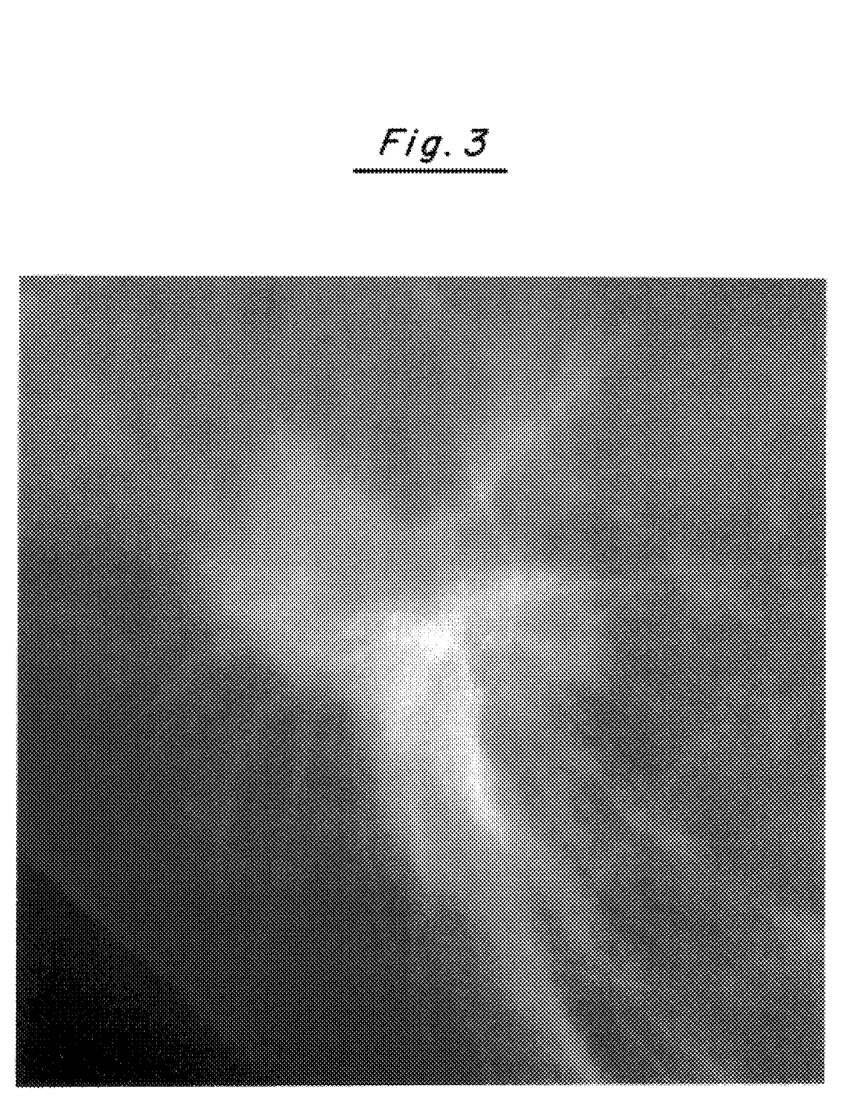
FIG. 3 is a section of a mammogram showing a region of interest that is potentially cancerous.

Peaks that are too small or too large are eliminated, as are peaks lower in actual brightness than the surrounding area ("dark spots"), elongated features (maximum length across significantly greater than minimum length) and peaks which are too close to other peaks. Peaks that survive the selection criteria are then used to select regions of interest (ROIs). FIG. 3 is an example of a section of a mammogram showing a region of interest that is potentially cancerous. These ROIs are extracted from the original high-resolution image in squares approximately 2–3 times feature size as measured by the first criteria and scaled to fixed size (256×256 pixels). There are eight possible ROI resolutions, ranging from a minimum size of 9.7 mm (38 micron resolution) to a maximum size of 7.8 cm (305 micron resolution).

3. Analyze Regions of Interest.

Figure 4:
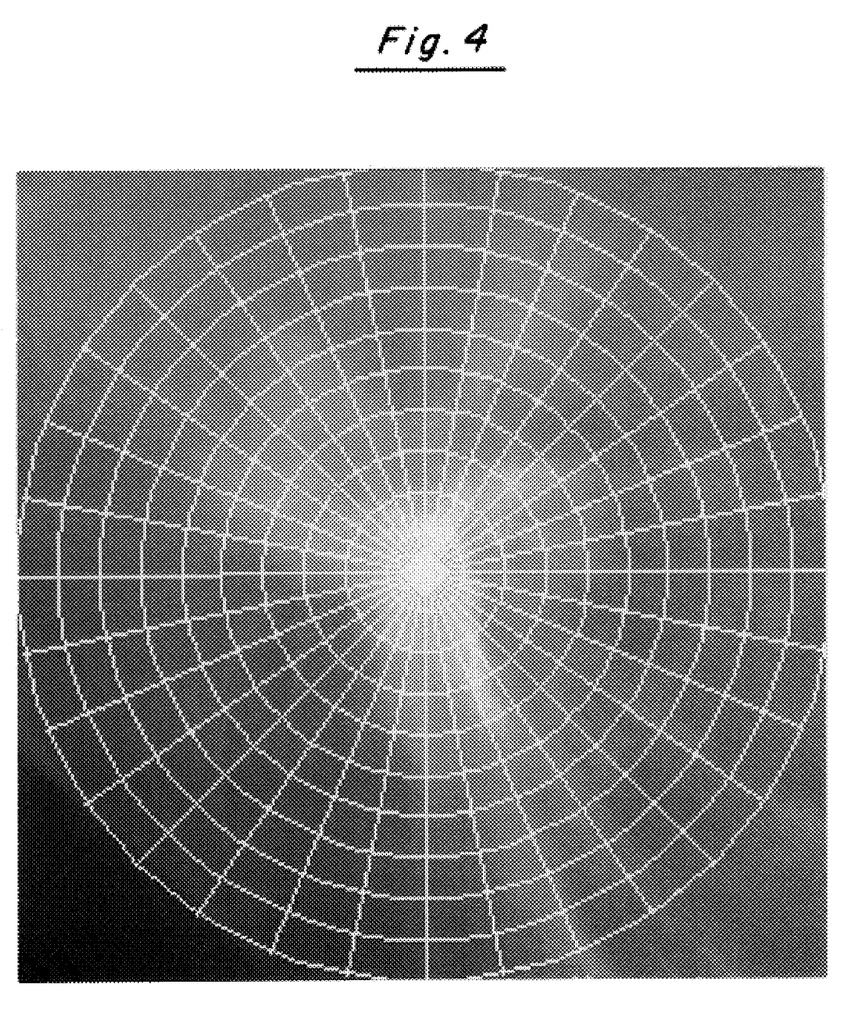
FIG. 4 is a section of a mammogram corresponding to FIG. 3 that has been overlaid with a super-pixel grid.
Figure 5:
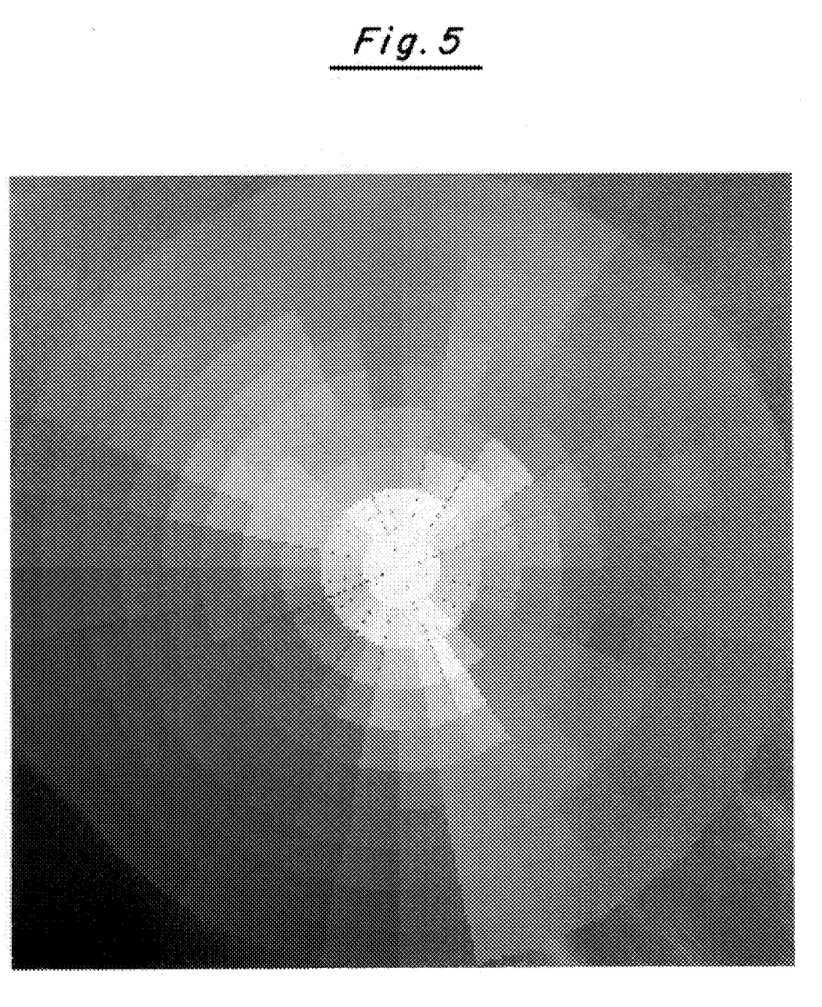
FIG. 5 is a section of a mammogram corresponding to FIG. 3 after the region of interest has been reduced to super-pixels.

Each region of interest is analyzed by means of a neural network using a super-pixeled image as an input. This grid is a radial-polar grid with the angles evenly spaced and constant radial increments. In the preferred embodiment, the grid consists of 10 equally-spaced radial and 32 equally-spaced angular bands. The pixels in each grid space are averaged together to create 320 "super-pixels" (reference numeral 24 in FIG. 2). The super-pixels, along with two inputs determined from the approximate size of the feature, are used as the inputs to the first neural net 14. For example, FIG. 4 is a section of a mammogram corresponding to FIG. 3 that has been overlaid with a super-pixel grid. FIG. 5 is a section of a mammogram corresponding to FIG. 3 after the region of interest has been reduced to super-pixels.

The first neural network 14 is trained on both cancerous and non-cancerous regions of interest. Regions of Interest (ROIs) are selected from known (verified normal or verified cancerous) mammograms. These ROIs are ranked according to their appearance, with +1 being most normal-like and −1 being most lesion-like. The ROIs are then converted to super-pixels for input to the first neural network. A random scaling, rotation and translation of the super-pixel grid is performed, and half of the image (angularly) is chosen in a way that excludes any parts of the ROI outside the original area of the mammogram (These edges are generated by superimposing an odd-sized image on a fixed-sized background). The values of the half-grid are normalized in two steps: A stretching of the values over a fixed range increases the contrast within the half-grid, while a normalization of the sum of all the half-grid inputs assures consistency in brightness over all possible half-grids. A statistical thresholding of the ROI is used to determine the approximate "size" of the main feature in the ROI. This size measurement is converted to an equivalent diameter, perturbed by the same scaling perturbation used on the super-pixel grid, then converted into a pair of inputs, using a sine-cosine transformation. These two values, along with the grid super-pixels, are input to the first neural network using a randomly initialized set of neural network weights. The output of the first neural network (restricted between +1 and −1) is compared with the chosen ranking. An error value is calculated and used to correct the neural network weights using a back-propagation learning algorithm known as REM (Recursive Error Minimization). The REM algorithm uses the derivatives of the propagated error to create a more stable convergence than conventional back-propagation. A new set of perturbations is then applied to the next ROI, creating a new half-grid, which is again normalized and applied to the network. This process is repeated until the RMS of the error values drops to a small value, or the change in the error over several iterations becomes very small, whichever occurs first. This signifies that the network is now trained. The number of iterations depends on several conditions, but in general will take about 1000–3000 cycles through the complete set of ROIs.

Once trained, a set of ROIs selected from "unknown" mammograms is processed through the neural network (reference numeral 25 in FIG. 2). No perturbations are done on these inputs, although the grid is rotated through all possible angles, one angular grid space at a time, such that no half-grid includes any "edges". Each half-grid in turn is normalized as above, and applied to the trained network along with the two size inputs from the ROI. The outputs for the rotations are combined, producing two or three statistical outputs for each ROI. These outputs are then used as part of the set of inputs for the second neural network 15, as discussed below.

4. Analyze Regions of Interest in Context of Mammogram.

Figure 6:
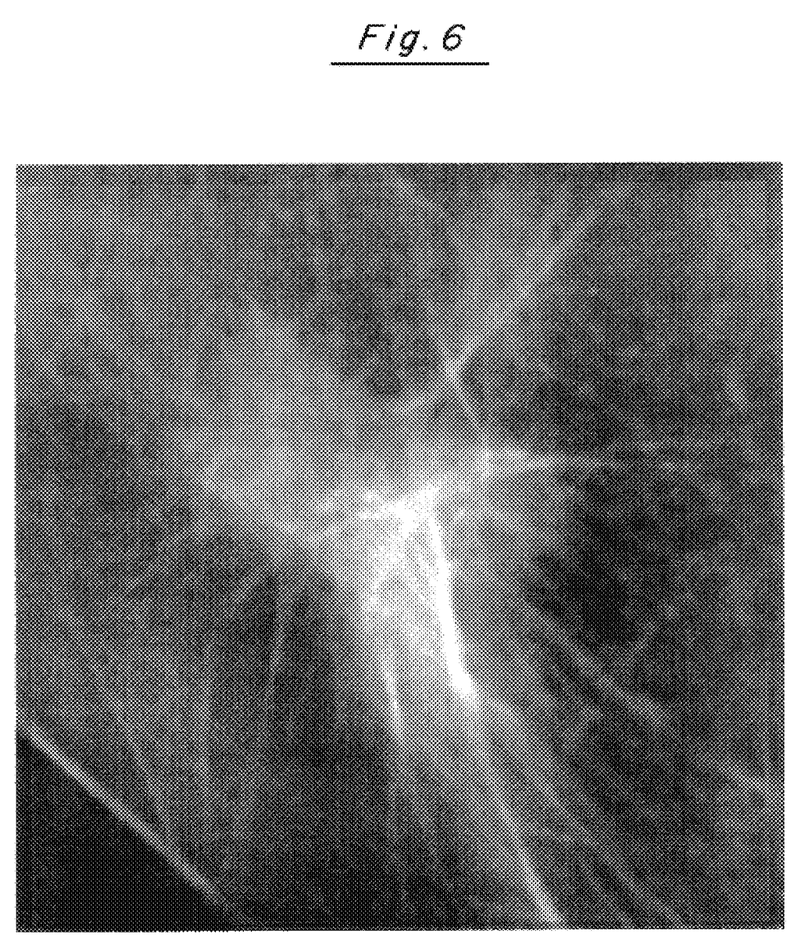
FIG. 6 is a section of a mammogram corresponding to FIG. 3 after the region of interest has been enhanced.

A combination of 16 wavelet filters and two bandpass filters are applied to each region of interest to create enhanced ROIs at reference numeral 22 in FIG. 2. FIG. 6 is a section of a mammogram corresponding to FIG. 3 after the ROI has been enhanced to emphasize the contours and lines of the features in the image. At reference numeral 23 in FIG. 2, these enhanced images are used, along with the original ROIs, to generate context inputs for the second neural net 15 (or "context network"). The context inputs for the context network 15 includes the location, ranking, brightness and density profiles, sizes of inner and outer features, relative isolation from other ROIs, roughness of contours, fuzziness, and the number and length of any spicules. The distance of the center of each ROI from the nipple is determined by:

(a) For the mediolateral view, locating the chest wall (if possible), and measuring the distance of the ROI from the nipple perpendicular to the chest wall;

(b) For the craniocaudal view, measuring the horizontal distance of the ROI from the nipple.

For each ROI, up to five ROIs in the alternate view are selected that are within 50% of the same distance from the nipple. Sizes and output values from the first neural network 14 are also used as inputs to the context neural net 15. The context inputs to the second neural net 15 are calculated by using sine and cosine transformations of the parameters defined above.

The context neural net 15 is initially trained, again using verified cancerous and non-cancerous cases with random deviations for each input to generate training examples. The context inputs for each ROI are determined, including the outputs from the trained first neural network 14. Each input is perturbed by a random value (e.g., +/−10%) and then converted into a pair of inputs using a sine-cosine transformation. The full set of inputs is applied to the second neural network 15 using a randomly initialized set of neural network weights. The output of the second neural network 15 is compared to the same ranking value used for the first neural network 14. The weights are corrected by the method cited above, and the second network 15 is trained to convergence using about 1000–3000 cycles through the set of ROIs.

The "unknown" ROIs are passed once through the trained second network 15 without perturbations. The output of this network is then combined with that of other ROIs belonging to the same mammogram (including other views, other breast and/or other years) to characterize the ROI and the mammogram. After training is complete, the trained context neural network 15 can then be used to evaluate unknown cases (reference numeral 26 in FIG. 2).

In the preferred embodiment of the present invention, the context neural net 15 is a second network separate from the first neural network 14 used in step 3. However, it should be expressly understood that other configurations could be substituted. For example, a single neural net could receive both the ROI super-pixels and context data as inputs.

5. Threshold Regions of Interest

After training is complete, an ROC curve is generated from the output score produced by the second neural network in response to sets of known mammograms. An appropriate threshold output score can be determined from the resulting ROC curve which will achieve the desired probability of detection and false alarm rate.

This threshold can then be used to classify unknown cases during normal operation of the system (reference numeral 27 in FIG. 2). For example, the threshold score is used by the decision software 16, as depicted in FIG. 1, to generate a report for the radiologist.

6. Create Report

Figure 7:
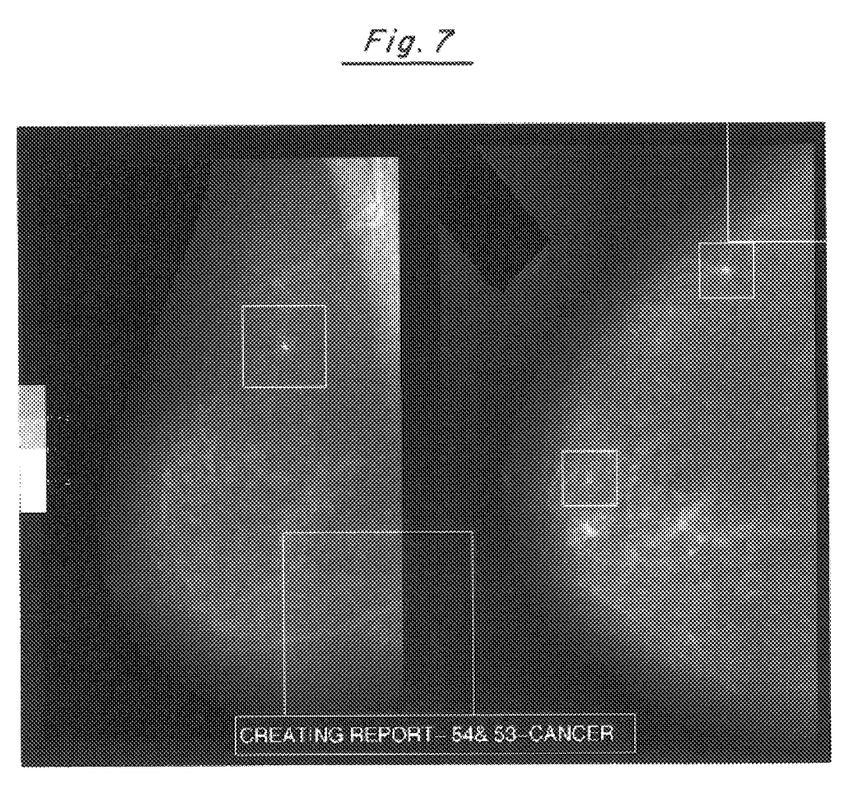
FIG. 7 is an example of a report consisting of two views in a mammogram with the suspicious regions of interest marked.

A user-friendly graphical report is provided to the radiologist on a CRT or other display 17 (reference numeral 28 in FIG. 2). FIG. 7 is an example of a report consisting of two views in a mammogram with the suspicious regions of interest marked. This report typically shows both views of the mammogram, along with a classification determined by the analysis of the neural networks. The locations of suspect masses are marked on the display. For example, the final classifications might include the following:

(a) "Suspect" mammogram has at least one ROI detected on either view with a value less than a predetermined threshold (i.e., more lesion-like), but more than a fixed level (e.g., 0.2) below the threshold. A mammogram with such a designation needs further review by the radiologist.

(b) "Cancer" mammogram has at least one ROI detected on either view with a value less than the minimum defined above for a "suspect." A mammogram with such a designation needs further review by the radiologist.

(c) "Normal" mammogram has no ROIs on either view with values less than the threshold. This mammogram needs no further review.

7. Results

A round-robin test was run with over 100 different pairs (two views per breast) of mammograms analyzed. The results of this test showed that, when the threshold was set to detect 100% of the cancers, approximately 50% of the mammograms were screened, with less than 0.7 false positives per image.

Application

The present system can be used by a radiologist in either of two modes of operation. In the first mode, the system merely aides the radiologist by flagging any ROIs falling into the "Suspect" or "Cancer" classifications. The radiologist continues to thoroughly review each mammogram and remains responsible for diagnosis. The system is equipped with an image archive 18 shown in FIG. 1. The archive can store each mammogram or only those mammograms designated by the radiologist. In the second mode ("screening mode"), the system analyzes each mammogram and only those classified as "Suspect" or "Cancer" are brought to the attention of the radiologist for further review. "Normal" mammograms are sent directly to the image archive 18 for archival storage.

Other Context Inputs

In addition to the embodiment described above, a number of additional types of context data can be input into the context neural net to enhance the accuracy of the system. For example, the ROIs can be analyzed in the context of information from the other view of same breast. This step can be combined with the previous step using the second neural network 15 as described above, or performed separately using a third neural network. The additional context data can include information on the size and brightness of the ROI under question as well as other ROIs in the same breast and ROIs in the alternate view which have nearly the same perpendicular distance to the nipple. For training purposes, each value is allowed to vary over a specified range to gain additional test cases. The second neural network 15 is then trained using both cancerous and non-cancerous ROIs. The resulting connections are then used to evaluate ROIs outside of the training set.

Similarly, the ROIs can be analyzed in the context of the same view of other breast for the same patient. This step is implemented by performing the same operations on the other breast, then cross-correlating the information to determine asymmetries between the two breasts. For example, additional context inputs can be input into the context neural net 15 corresponding to the sizes and density network results for ROIs in similar locations on the other breast. These additions should produce a significant reduction in the false alarm rate, since it is very unlikely that cancers would symmetrically develop in both breasts. This implementation is conceptually identical to the use of context inputs derived from alternative views of the same breast as previously discussed, but requires additional sets of mammograms for adequate training of the context neural net 15.

The ROIs can also be analyzed in the context of prior year mammograms for the same patient. Additional context inputs can be input into the context neural net 15 corresponding to ROIs in similar locations in prior-year mammograms for the same patient. This is similar to the use of context inputs derived from contemporaneous alternate views, as described above, but instead relies on detecting changes that have occurred since previous mammograms. These additional context inputs should produce a significant reduction in the false alarm rate in light of the temporal development properties of cancers in contrast to non-cancers. Here again this implementation requires a additional sets of mammograms for adequate training of the context neural net 15.

The previous discussion has been directed primarily to detection of cancerous masses in mammograms. It should be expressly understood that the present invention could be employed to detect abnormalities in a wide variety of medical images. For example, the present system could be used to detect cancer or other types of lesions in a chest x-ray film; or cancerous and pre-cancerous cells in a pap smear or biopsy.

The above disclosure sets forth a number of embodiments of the present invention. Other arrangements or embodiments, not precisely set forth, could be practiced under the teachings of the present invention and as set forth in the following claims.

We claim:

1. A method for automated analysis of a digitized mammogram to detect the presence of a possible cancerous mass comprising:

detecting a region of interest (ROI) using said digitized mammogram and Fourier spatial bandpass analysis, said ROI corresponding with a possible cancerous mass, wherein a plurality of spatially bandpassed images of different resolutions corresponding with said digitized mammogram are employed to identify at least one brightness peak corresponding with the ROI;

extracting context data for said ROI from said digitized mammogram, said context data comprising attribute information determined in specific relation to the ROI; and inputting image data corresponding with said ROI and said context data to a neural net trained in relation to the attributes of cancerous tissue regions, and generating an output from said neural net indicating whether a possible cancerous tissue mass is present in said ROI.

2. The method of claim 1 wherein the step of detecting a ROI is performed by an optical processor separate from said neural net.

3. The method of claim 1 further comprising the step of averaging pixels corresponding with only said ROI to create a smaller number of super-pixels that are input to said neural net.

4. The method of claim 3 wherein said super-pixels are arranged in a radial-polar pattern.

5. The method of claim 4, wherein said radial-polar pattern comprises a first predetermined number of equally spaced radial bins and a second predetermined number of equally spaced angular bins, said radial and angular bins defining a plurality of grid spaces, and wherein for each grid space the included ROI pixels are averaged to obtain said super pixels.

6. The method of claim 1 wherein said context data comprises the location of said ROI relative to a standard anatomical landmark in said digitized mammogram.

7. The method of claim 1 wherein said context data comprises the size of said ROI.

8. The method of claim 1 wherein said context data comprises brightness and density profiles of said ROI.

9. The method of claim 1 wherein said context data comprises the relative isolation of said ROI from other ROIs in said digitized mammogram.

10. The method of claim 1 wherein said context data comprises the number and length of any spicules in said ROI.

11. The method of claim 1 wherein said context data comprises information about other ROIs in said digitized mammogram.

12. The method of claim 1 further comprising the step of enhancing the contours of said ROI using spatial bandpass and spatial wavelet filters before extracting said context data.

13. The method of claim 1 wherein said neural net comprises:
a first neural net receiving image data corresponding with said ROI as an input and generating at least one output value; and
a second neural net receiving said output values from said first neural net and said context data as inputs and generating an output indicating whether a possible cancerous mass is present in said ROI.

14. The method of claim 13, further comprising the substep of averaging pixels in said digitized mammogram corresponding with said ROI to obtain the image data, and wherein said input to said first neural net includes information corresponding with a size of said ROI.

15. The method of claim 14, wherein said context data comprises a least two types of information selected from a group consisting of: ROI location information, ROI size-related information, ROI brightness and density profile information, ROI isolation information relative to other detected regions of interest, ROI information relating to spicules therewithin.

16. The method of claim 15, wherein said context data is calculated from sine and cosine transformation of said at least two types of information.

17. The method of claim 1 wherein said neural net is initially trained using perturbations of a set of training images, said perturbations being generated by at least one of random scaling, rotation and translation of training images comprising said set of training images.

18. The method of claim 1, further comprising the step of reducing a resolution of said digitized mammogram for use in the detecting step.

19. The method of claim 1, further comprising the step of spatial bandpass filtering said digitized mammogram image to obtain said plurality of spatially bandpassed images, wherein a corresponding plurality of bandpass filters having differing resolutions are employed.

20. The method of claim 1, wherein said detecting step includes the substep of estimating, for at least one of said plurality of differing bandpassed images, the size of said at least one brightness peak based upon a determination of the number of pixels around said at least one brightness peak having a brightness within each of the following: a first predetermined percentage of a brightness of the peak in at least one bandpassed image; a second predetermined percentage of a brightness of the digitized mammogram measured at the corresponding peak location; and a third predetermined brightness percentage of a maximum brightness of the digitized mammogram.

21. The method of claim 20, wherein a resolution of a said digitized mammogram is reduced.

22. The method of claim 20, wherein said estimating substep comprises the additional substep of calculating a radial size of said at least one brightness peak by measuring a distance from said peak in a plurality of directions until corresponding pixel brightness is one of the following: less than $1/\exp(2)$ of the corresponding peak brightness; less than a predetermined percentage of a brightness of the digitized mammogram measured at the corresponding peak location; or greater than a predetermined percentage higher than the next pixel closer to the peak.

23. The method of claim 1, wherein said detecting step includes the substep of estimating, for at least one of the said plurality of differing bandpassed images, a size of said at least one brightness peak by comparing said at least one of said plurality of differing bandpassed images with said digitized mammogram.

24. The method of claim 1, further comprising the step of applying a predetermined plurality of spatial bandpass and spatial wavelet filters to obtain an enhanced image of said ROI.

25. The method of claim 24, wherein said enhanced image is employed to obtain at least a portion of said context data.

26. A system for automated detection of cancerous masses in mammograms comprising:
means for inputting a digital mammogram;
an optical processor for detecting a region of interest (ROI) using said digital mammogram and Fourier spatial bandpass analysis, said ROI corresponding with a possible cancerous mass, wherein a plurality of spatially bandpassed images of different resolutions corresponding with said digital mammogram are employed to identify at least one brightness peak corresponding with the ROI;

means for extracting context data for said ROI from said mammogram, said context data comprising attribute information determined in specific relation to the ROI; and a neural net trained in relation to the attributes of cancerous tissue regions, for receiving image data corresponding with said ROI and said context data as inputs and for generating an output indicating whether said ROI contains a possible cancerous mass.

27. The system of claim 26 further comprising means for averaging pixels corresponding with only said ROI to create a smaller number of super-pixels that are input to said neural net.

28. The system of claim 27 wherein said super-pixels are arranged in a radial-polar pattern.

29. The system of claim 26 wherein said context data comprises the location of said ROI relative to the nipple in said mammogram.

30. The system of claim 26 wherein said context data comprises the size of said ROI.

31. The system of claim 26 wherein said context data comprises the brightness and density profiles of said ROI.

32. The system of claim 26 wherein said context data comprises the relative isolation of said ROI from other ROIs in said mammogram.

33. The system of claim 26 wherein said context data comprises the number and length of any spicules in said ROI.

34. The system of claim 26 wherein said context data comprises information about other ROIs in said mammogram.

35. The system of claim 26 wherein said mammogram includes a plurality of views of the same breast, and wherein said context data comprises information from another view of the same breast.

36. The system of claim 26 wherein said mammogram includes views of both breasts, and wherein said context data comprises information about the other breast.

37. The system of claim 26 wherein said context data includes information from a previous mammogram for the same patient.

38. The system of claim 26 further comprising filter means for enhancing the contours of said ROI before extracting said context data.

39. The system of claim 26 wherein said neural net comprises:

a first neural net receiving said ROI as an input and generating at least one output value; and a second neural net receiving said output values from said first neural net and said context data as inputs and generating an output indicating whether said ROI contains a cancerous mass.

40. The system of claim 26 wherein neural net is initially trained using perturbations of a set of training images, said perturbations being generated by at least one of random scaling, rotation and translation of training images comprising said set of training images.

41. A system for automated detection of cancerous masses in mammograms comprising:

means for inputting a digital mammogram containing a first array of pixels;

an optical processor to detect a region of interest (ROI) using said digital mammogram and Fourier spatial bandpass analysis, said ROI corresponding with a possible cancerous mass, wherein a plurality of spatially bandpassed images of different resolutions corresponding with said digital mammogram are employed to identify at least one brightness peak corresponding with the ROI;

means for averaging pixels of said first array that correspond with only said ROI to create a second array of super-pixels;

a first neural net, trained in relation to the attributes of cancerous tissue regions, for receiving said second array of super-pixels as an input and generating at least one output value; and a second neural net, trained in relation to the attributes of cancerous tissue regions, for receiving said at least one output value from said first neural net and at least a portion of said context data as inputs and generating an output indicating whether said ROI contains a possible cancerous mass.

42. The system of claim 41 wherein said super-pixels are arranged in a radial-polar pattern.

43. The system of claim 41 wherein said context data comprises information about other ROIs in said mammogram.

44. The system of claim 41 wherein said mammogram includes a plurality of views of the same breast, and wherein said context data comprises information from another view of the same breast.

45. The system of claim 41 wherein said mammogram includes views of both breasts, and wherein said context data comprises information about the other breast.

46. The system of claim 41 wherein said context data includes information from a previous mammogram for the same patient.

47. The system of claim 41 further comprising spatial bandpass and spatial wavelet filter means for enhancing the contours of said ROI before extracting said context data.

* * * * *

UNITED STATES PATENT AND TRADEMARK OFFICE
CERTIFICATE OF CORRECTION

PATENT NO. : 6,246,782 B1
DATED : June 12, 2001
INVENTOR(S) : Shapiro et al.

It is certified that error appears in the above-identified patent and that said Letters Patent is hereby corrected as shown below:

Column 10,
Line 23, delete the word "differing" and insert therefor -- spatially --;

Column 12,
Line 18, insert the following paragraph: -- means for extracting context data for said ROI from said mammogram, said context data comprising attribute information determined in specific relation to the ROI; --.

Signed and Sealed this

Second Day of April, 2002

*Attest:*

JAMES E. ROGAN
*Attesting Officer*  *Director of the United States Patent and Trademark Office*